(12) United States Patent
Yokoyama et al.

(10) Patent No.: US 8,201,527 B2
(45) Date of Patent: Jun. 19, 2012

(54) AUXILIARY-DEVICE ARRANGEMENT FOR CYLINDER-DEACTIVATION MULTI-CYLINDER INTERNAL COMBUSTION ENGINE AND CYLINDER-DEACTIVATION MULTI-CYLINDER INTERNAL COMBUSTION ENGINE

(75) Inventors: Naoki Yokoyama, Wako (JP); Masahiro Nakajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 12/578,590

(22) Filed: Oct. 14, 2009

(65) Prior Publication Data

US 2010/0132641 A1 Jun. 3, 2010

(30) Foreign Application Priority Data

Dec. 1, 2008 (JP) ................................. 2008-305862

(51) Int. Cl.
*F01L 1/34* (2006.01)
(52) U.S. Cl. ............... 123/90.16; 123/90.15; 123/90.27; 123/90.39; 123/90.44
(58) Field of Classification Search ............... 123/90.16, 123/90.15, 90.27, 90.31, 90.39, 90.44
See application file for complete search history.

(56) References Cited

U.S. PATENT DOCUMENTS

| 5,899,181 A * | 5/1999 | Kurata et al. .............. 123/90.17 |
| 6,138,636 A * | 10/2000 | Kohno et al. .............. 123/198 F |
| 7,503,296 B2 * | 3/2009 | Rozario et al. .............. 123/90.16 |

FOREIGN PATENT DOCUMENTS

| JP | 10-176508 | | 6/1998 |
| JP | 2000-145422 | | 5/2000 |
| JP | 2006207440 A | * | 8/2006 |

* cited by examiner

*Primary Examiner* — Ching Chang
(74) *Attorney, Agent, or Firm* — Ditthavong Mori & Steiner, P.C.

(57) ABSTRACT

An auxiliary-device arrangement for a cylinder-deactivation multi-cylinder internal combustion engine includes an auxiliary-device driving member and an auxiliary device. The cylinder-deactivation multi-cylinder internal combustion engine is capable of deactivating at least one deactivated cylinder by keeping an intake valve and an exhaust valve closed while at least one operating cylinder is operating. The auxiliary-device driving member is provided adjacent to an operating cam of a valve operating cam shaft which is provided in the at least one operating cylinder. The auxiliary device has an operating member via which the auxiliary device contacts the auxiliary-device driving member.

20 Claims, 6 Drawing Sheets

AUXILIARY-DEVICE ARRANGEMENT FOR CYLINDER-DEACTIVATION MULTI-CYLINDER INTERNAL COMBUSTION ENGINE AND CYLINDER-DEACTIVATION MULTI-CYLINDER INTERNAL COMBUSTION ENGINE

CROSS-REFERENCE TO RELATED APPLICATIONS

The present application claims priority under 35 U.S.C. §119 to Japanese Patent Application No. 2008-305862, filed Dec. 1, 2008. The contents of this application are incorporated herein by reference in their entirety.

BACKGROUND OF THE INVENTION

1. Field of the Invention

The present invention relates to an auxiliary-device arrangement for a cylinder-deactivation multi-cylinder internal combustion engine and a cylinder-deactivation multi-cylinder internal combustion engine.

2. Discussion of the Background

Various cylinder-deactivation multi-cylinder internal combustion engines have been proposed (refer to, for example, Japanese Unexamined Patent Application Publication No. 2000-145422).

In a cylinder-deactivation mechanism discussed in Japanese Unexamined Patent Application Publication No. 2000-145422, operating cams and deactivation cams, which constitute cam surfaces at base circles not having cam protrusions, are formed side by side at valve operating cam shafts in an axial direction. In addition, operating locker arms and deactivation locker arms are provided adjacent to each other in correspondence with the operating cams and the deactivation cams. The deactivation locker arms cause intake valves or exhaust valves to open and close by contacting the intake valves or the exhaust valves.

In addition, the operating locker arms and the deactivation locker arms are connected to each other by a connection switching mechanism and operate together, and are disconnected from each other and operate independently of each other.

In the connected state, the deactivation locker arms are swung together with the operating locker arms that are swung by the operating cams, so that the intake valves or the exhaust valves are driven so as to open or close at a required timing. In the disconnected state, the deactivation locker arms that contact the deactivation cams are in an independently operating state, so that the intake valves or the exhaust valves are in a closed and deactivated state.

In an example of a multi-cylinder internal combustion engine including an OHC valve operating mechanism, an auxiliary device is driven by rotating a valve operating cam shaft (refer to, for example, Japanese Unexamined Patent Application Publication No. 10-176508).

Japanese Unexamined Patent Application Publication No. 10-176508 discusses a DOHC inline four-cylinder internal combustion engine. In this internal combustion engine, an inlet cam shaft and an exhaust cam shaft are disposed parallel to each other above a cylinder row, and a timing belt is wound upon a driven pulley (provided at one end of each cam shaft) and a drive pulley (provided at a crank shaft) to rotate both cam shafts at a rotational speed that is half that of the crank shaft.

In addition, a pump cam is formed at an end portion of the inlet cam shaft opposite to the driven pulley, and a fuel injection pump is disposed by contacting a cam lifter with the pump cam.

By reciprocating the pump lifter by the pump cam that rotates together with the inlet cam shaft that rotates, the fuel injection pump sends pressurized fuel to a fuel injection valve, so that the fuel injection valve directly injects fuel into a fuel chamber at a high pressure.

Japanese Unexamined Patent Application Publication No. 10-176508 does not discuss an internal combustion engine whose cylinders are deactivated. If the structure discussed in Japanese Unexamined Patent Application Publication No. 10-176508 is applied to a cylinder-deactivation multi-cylinder internal combustion engine such as that discussed in Japanese Unexamined Patent Application Publication No. 2000-145422 and if a fuel injection pump is disposed as in Japanese Unexamined Patent Application Publication No. 10-176508, a pump cam is formed at an end portion of an inlet cam shaft, the inlet cam shaft becomes long, and the disposition of the fuel injection pump cause the entire length of the internal combustion engine in a cam shaft direction to be increased

SUMMARY OF THE INVENTION

According to one aspect of the present invention, an auxiliary-device arrangement for a cylinder-deactivation multi-cylinder internal combustion engine includes an auxiliary-device driving member and an auxiliary device. The cylinder-deactivation multi-cylinder internal combustion engine is capable of deactivating at least one deactivated cylinder by keeping an intake valve and an exhaust valve closed while at least one operating cylinder is operating. The auxiliary-device driving member is provided adjacent to an operating cam of a valve operating cam shaft which is provided in the at least one operating cylinder. The auxiliary device has an operating member via which the auxiliary device contacts the auxiliary-device driving member.

According to another aspect of the present invention, a cylinder-deactivation multi-cylinder internal combustion engine includes at least one operating cylinder, at least one deactivated cylinder, an auxiliary-device driving member, and an auxiliary device. The at least one deactivated cylinder is configured to be deactivated by keeping an intake valve and an exhaust valve closed while the at least one operating cylinder is operating. The auxiliary-device driving member is provided adjacent to an operating cam of a valve operating cam shaft which is provided in the at least one operating cylinder. The auxiliary device has an operating member via which the auxiliary device contacts the auxiliary-device driving member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
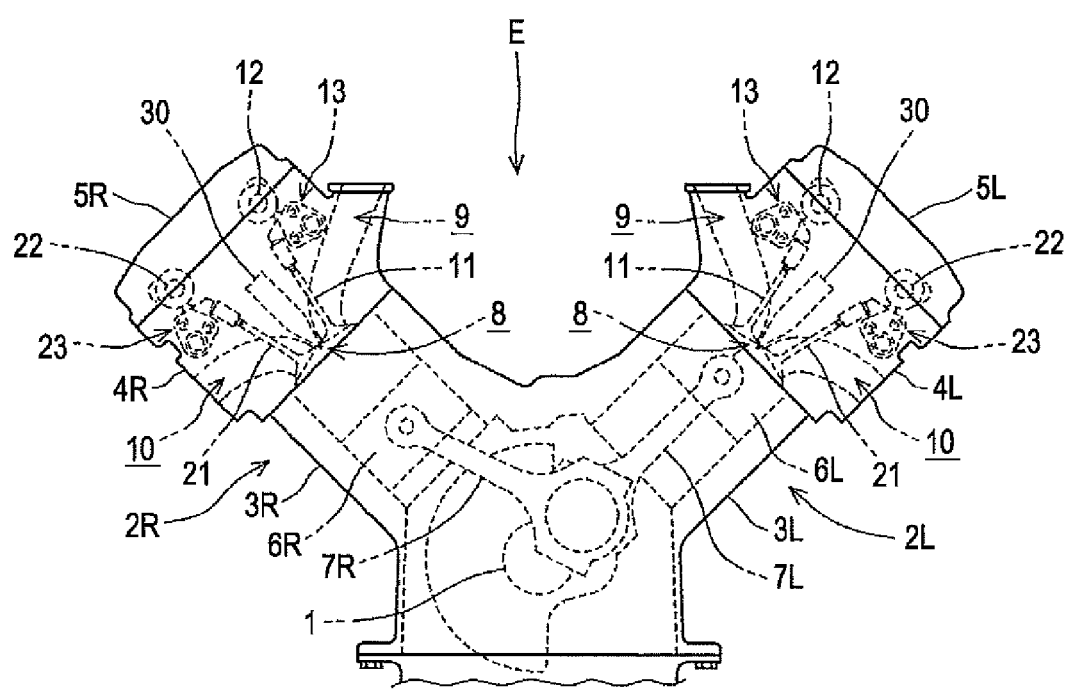
FIG. 1 is a front view of a portion of a water-cooling four-stroke V type eight-cylinder internal combustion engine according to an embodiment of the present invention

Embodiments will now be described with reference to the accompanying drawings, wherein like reference numerals designate corresponding or identical elements throughout the various drawings. A description of an embodiment of the present invention will hereunder be given with reference to FIGS. 1 to 6.

An internal combustion engine according to the embodiment corresponds to a water-cooling four-stroke V type eight-cylinder internal combustion engine E for installation in a vehicle. A crankshaft 1 is oriented in a front-back direction of a vehicle body, and is installed in a vehicle. A left cylinder row 2L and a right cylinder row 2R are divided on the left and right sides and are banked so as to form a V shape. (Refer to FIG. 1.)

In the left cylinder row 2L, four cylinders 3L are disposed in series. In the right cylinder row 2R, four cylinders 3R are disposed in series. The left cylinder row 2L is slightly displaced towards the front than the right cylinder row 2R. (Refer to FIG. 2.)

Figure 2:
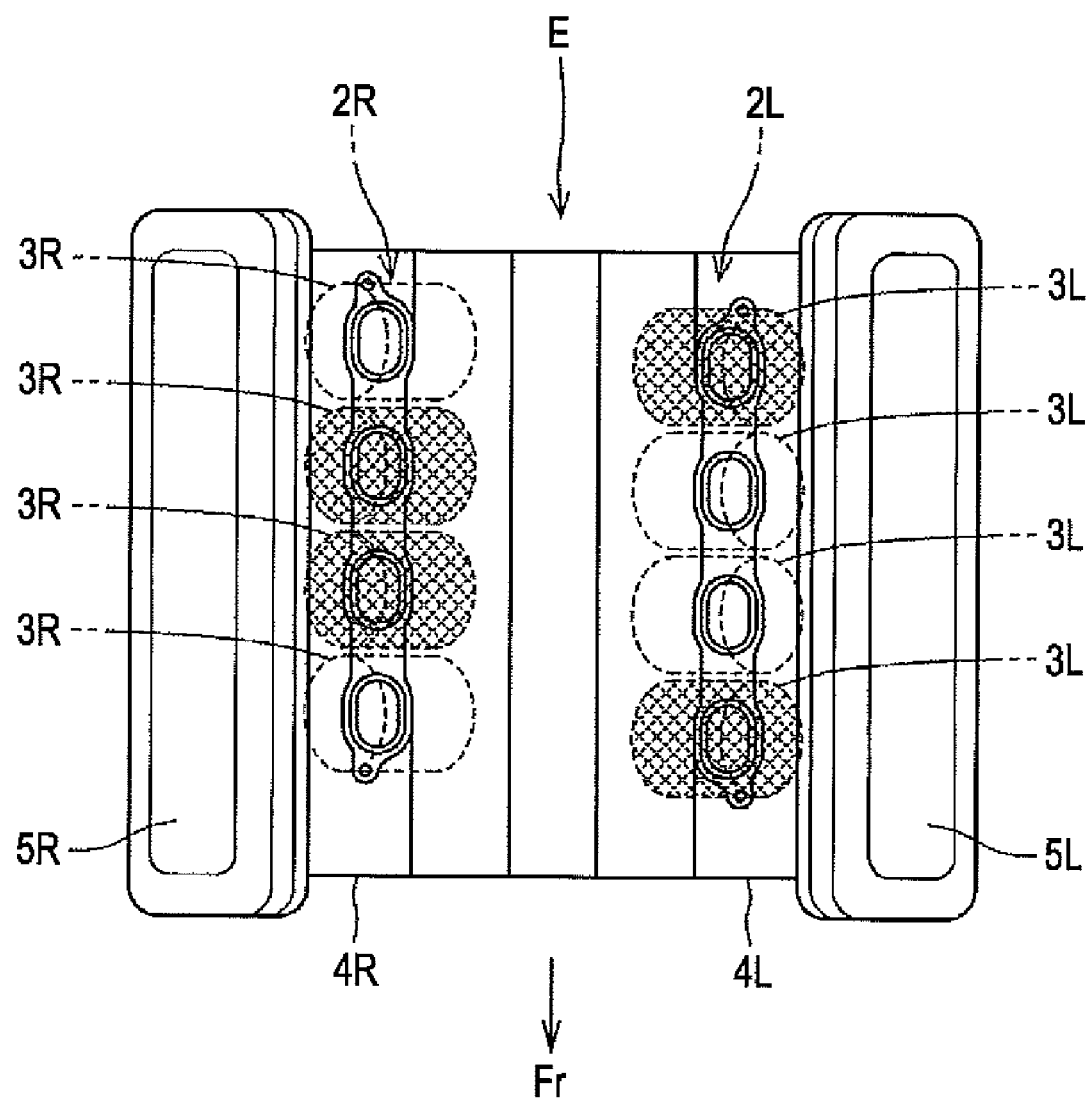
FIG. 2 is a plan view thereof.

FIG. 1 is a front view of the internal combustion engine E. The left and right sides when FIGS. 1 and 2 are viewed are opposite to the left and right sides with reference to the vehicle body.

A cylinder head 4L and a cylinder head 4R are superimposed upon the left cylinders 3L and the right cylinders 3R, respectively, so as to fastened them together. A head cover 5L and a head cover 5R cover the cylinder head 4L and the cylinder head 4R, respectively. The cylinders 3L on the left bank, the cylinder head 4L, and the head cover 5L, and the cylinders 3R on the right bank, the cylinder head 4R, and the head cover 5R project so as to form a V shape.

A piston crank mechanism is formed by interposing connecting rods 7L and 7R between the crank shaft 1 and the respective pistons 6L and 6R that reciprocate in cylinder bores of the respective cylinders 3L and 3R. Opening towards fuel chambers 8 and 8 (which the top surfaces of the pistons 6L and 6R in the respective cylinder heads 4L and 4R face), suction ports 9 and 9 extend towards a space (inner sides of the banks) between the left cylinder row 2L and the right cylinder row 2R, and exhaust ports 10 and 10 extend towards a side (outer sides of the banks) opposite to the space between the left cylinder row 2L and the right cylinder row 2R.

At the top portions of the cylinder heads 4L and 4R, what are called DOHC valve operating mechanisms having inlet cam shafts 12 and exhaust cam shafts 22 parallel to the crank shaft 1 are provided. The inlet cam shafts 12 are disposed at the inner sides of the banks, and the exhaust cam shafts 22 are disposed at the outer sides of the banks.

Intake valve driving devices 13 that convert rotational motion of the inlet cam shafts 12 into opening/closing motion of intake valves 11 are interposed between the inlet cam shafts 12 and the intake valves 11 that open and close the openings of the suction ports 9 that open to the fuel chambers 8.

Exhaust valve driving devices 23 that convert rotational motion of the exhaust cam shafts 22 into opening/closing motion of exhaust valves 21 are interposed between the exhaust cam shafts 22 and the exhaust valves 21 that open and close the openings of the exhaust ports 10 that open to the fuel chambers 8.

The intake valve driving devices 13 and the exhaust valve driving devices 23 all include valve lift amount changing mechanisms that change the valve lift amounts in accordance with the state of operation of the internal combustion engine. However, there are two types of driving devices, that is, a driving device that includes a deactivation mechanism capable of performing a deactivation operation by keeping the intake valves 11 and the exhaust valves 21 closed and a driving device that does not include the deactivation mechanism.

A cylinder provided with an intake valve driving device 13D having the deactivation mechanism and an exhaust valve driving device 23D having the deactivation mechanism corresponds to a deactivation cylinder. A cylinder provided with a constantly driving intake valve driving device 13C not having the deactivation mechanism and a constantly driving exhaust valve driving device 23C not having the deactivation mechanism corresponds to a constantly operating cylinder.

Four of the eight cylinders of the V type eight-cylinder internal combustion engine E are deactivation cylinders that can be deactivated by keeping the intake valves 11 and the exhaust valves 21 closed. Two outer cylinders (a first cylinder and a fourth cylinder from the front) of the left cylinder row 2L and two inner cylinders (a second cylinder and a third cylinder from the front) of the right cylinder row 2R are deactivation cylinders. The other four cylinders are constantly operating cylinders.

In FIG. 2, the deactivation cylinders are hatched by broken lines.

In the V type eight-cylinder internal combustion engine E, fuel injection valves 30 that directly inject fuel into the fuel chambers 8 are fitted and inserted into the centers of the top surfaces of the fuel chambers 8.

Although not illustrated, ignition plugs are also fitted and inserted into the top surfaces of the fuel chambers 8.

Figure 3:
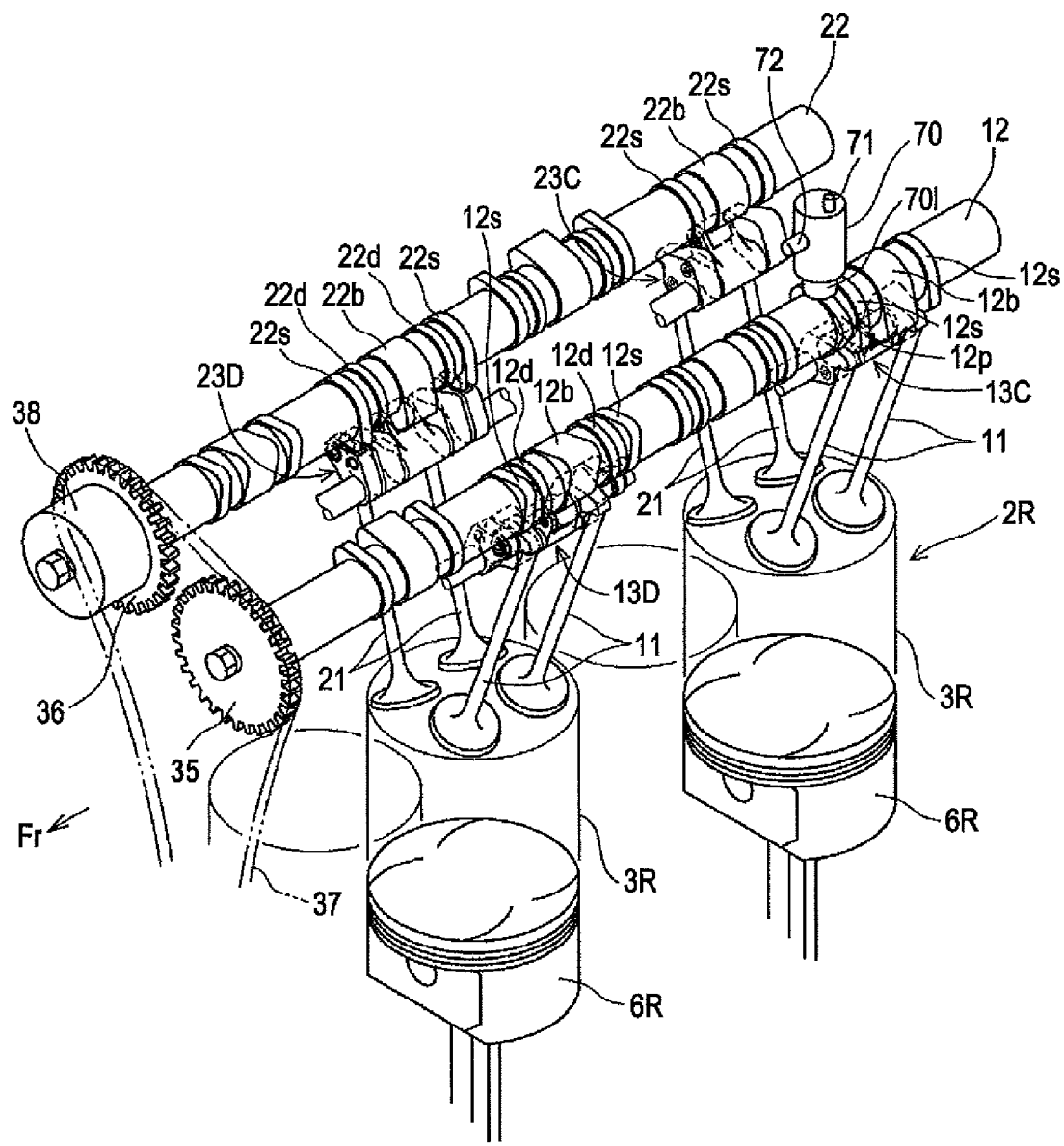
FIG. 3 is a perspective view of an intake valve shaft and an exhaust cam shaft in a valve operating mechanism, a second cylinder and a fourth cylinder from the front, and an intake valve driving device and an exhaust valve driving device thereof in a right cylinder row.

FIG. 3 is a perspective view of the inlet cam shaft 12 and the exhaust cam shaft 22, the second and the fourth cylinders from the front, and the intake valve driving device 13 and the exhaust valve driving device 23 thereof in the valve operating mechanism in the right cylinder row 2R. In the right cylinder row 2R, the two inner cylinders (that is, the second and third cylinders from the front) correspond to deactivation cylinders, and the two outer cylinders (that is, the first and fourth cylinders from the front) are constantly operating cylinders. Therefore, the second cylinder from the front is a deactivation cylinder, and is provided with the intake valve driving device 13D having the deactivation mechanism and the exhaust valve driving device 23D having the deactivation mechanism. The fourth cylinder from the front is a constantly operating cylinder, and is provided with the constantly driving intake valve driving device 13C and the constantly driving exhaust valve driving device 23C.

Figure 4:
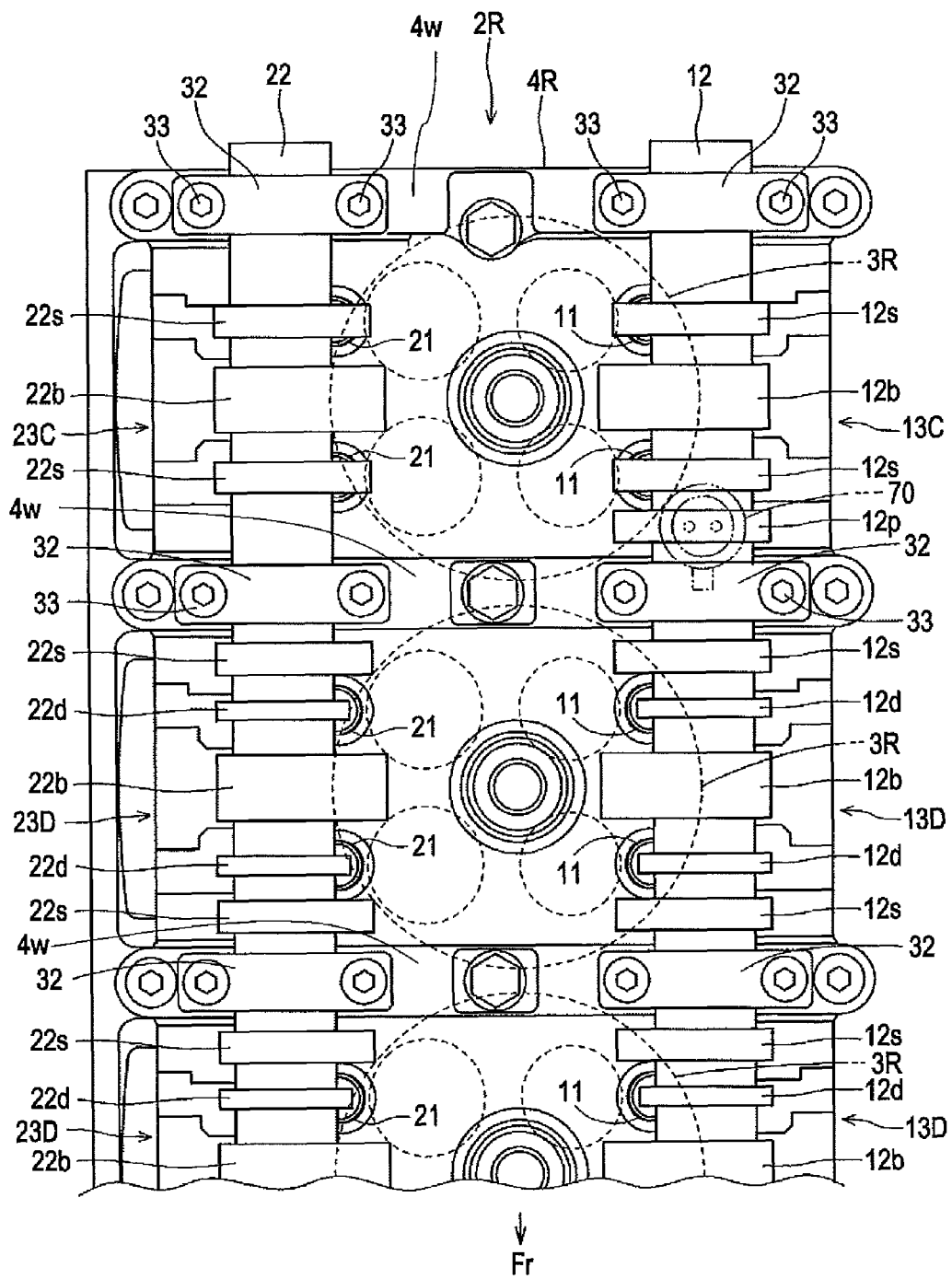
FIG. 4 is a partial plan view of a right cylinder head and a valve operating mechanism.

The inlet cam shaft 12 and the exhaust cam shaft 22 that are oriented in the front-back direction and are parallel to each other are supported so as to be interposed between five cam bearing walls 4w (projecting between the cylinders of the cylinder head 4R) and cam shaft holders 32 and 32 fastened with bolts 33 to five cam bearing walls 4w (FIG. 4).

Referring to FIG. 4, a large-displacement inlet cam 12b having a high cam protrusion at the center thereof is formed between the front and back cam shaft holders 32 and 32 corresponding to the constantly operating cylinder at the inlet cam 12. Low-displacement inlet cams 12s and 12s having low cam protrusions are formed on both sides of the large displacement inlet cam 12b and adjacent to the large displacement inlet cam 12b.

Similarly, a large-displacement inlet cam 22b having a high cam protrusion at the center is formed at a portion corresponding to the constantly operating cylinder of the exhaust cam shaft 22. Small-displacement inlet cams 22s and 22s having low cam protrusions are formed on both sides of the large-displacement inlet cam 22b and adjacent to the large-displacement inlet cam 22b.

A large-displacement inlet cam 12b having a high cam protrusion at the center thereof is formed between the front and back cam shaft holders 32 and 32 corresponding to the deactivation cylinder of the inlet cam shaft 12. Deactivation cams 12d and 12d constituting cam surfaces of base circles not having cam protrusions are formed at and adjacent to respective sides of the large-displacement inlet cam 12b. Further, small-displacement inlet cams 12s and 12s having low cam protrusions are formed outwardly of and adjacent to the deactivation cams 12d and 12d.

Similarly, a large-displacement inlet cam 22b having a high cam protrusion at the center thereof is formed at a portion corresponding to the deactivation cylinder of the exhaust cam shaft 22. Deactivation cams 22d and 22d having no cam protrusions are formed on both sides of the large-displacement inlet cam 22b. Further, small-displacement inlet cams 22s and 22s having low cam protrusions are formed outside of the deactivation cams 22d and 22d.

Compared to the case for deactivation cylinders, excess space is provided between the front and back cam shaft holders 32 and 32 corresponding to the constantly operating cylinders at the inlet cam shaft 12 and the exhaust cam shaft 22 by an amount corresponding to the deactivation cams 12d and 22d that are not provided. Accordingly, a pump cam 12p is formed between the cam shaft holder 32 and the small-displacement inlet cam 12s of the inlet cam shaft 12 corresponding to the constantly operating cylinder at the rear end.

A fuel injection pump 70 is disposed at the upper side of the pump cam 12p, and is driven by rotating the pump cam 12p by contacting a downwardly projecting pump lifter 701 (FIG. 3) with a cam surface of the pump cam 12p.

Driven pulleys 35 and 36 are fitted and mounted to the front end of the inlet cam shaft 12 and the front end of the exhaust cam shaft 22, respectively. A timing belt 37 is wound upon the driven pulleys 35 and 36 and driving pulleys (not shown), fitted and mounted to the crank shaft 1, so that rotation of the crank shaft 1 is transmitted to the inlet cam shaft 12 and the exhaust cam shaft 22 through the timing belt 37.

The rotation of the crank shaft 1 is transmitted to the inlet cam shaft 12 and the exhaust cam shaft 22 at a rotational speed that is half that of the crank shaft 1.

A valve phase varying mechanism 38 is provided at the front end of the exhaust cam shaft 22 (FIG. 3). The valve phase varying mechanism 38 varies the cam phase by changing the rotational angle of the driven pulley 36 and that of the exhaust cam shaft 22 relative to each other and setting an opening/closing period of the exhaust valves 21 at an advanced angle or a retarded angle.

Figure 5:
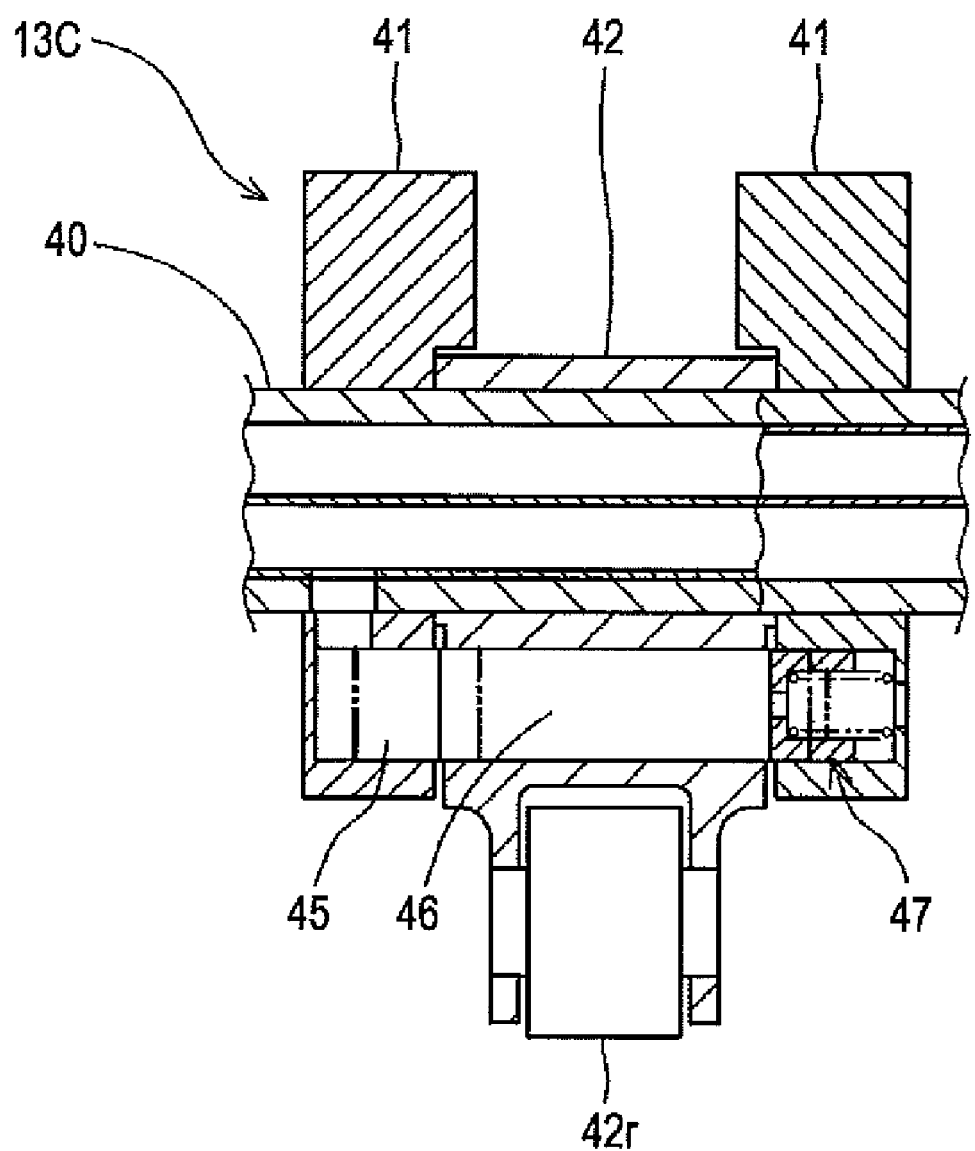
FIG. 5 is a sectional development view of a constantly driving intake valve driving device.

The constantly driving intake valve driving device 13C and the constantly driving exhaust valve driving device 23C have the same structure, and will be simply described with reference to a sectional development view of FIG. 5 of the constantly driving intake valve driving device 13C.

Valve driving locker arms 41 and 41 that are driven by contacting the pair of intake valves 11 and 11 of the constantly operating cylinder are swingably supported by a locker arm shaft 40. A free locker arm 42 is interposed between both valve driving locker arms 41 and 41 and is swingably supported by the locker arm shaft 40.

The valve driving locker arms 41 and 41 directly contact the small-displacement inlet cams 12s and 12s having low cam protrusions of the inlet cam shaft 12. A roller 42r supported at an end of the free locker arm 42 contacts the large-displacement inlet cam 12b having a high cam protrusion of the inlet cam shaft 12.

The valve driving locker arm 41, the free locker arm 42, and the valve driving locker arm 41, which are successively disposed adjacent to each other, are fitted and inserted by biasing switching pins 45 and 46 against pin holes (which become coaxial in a closed valve state) by a biasing unit 47.

When hydraulic pressure acts upon the switching pin 45 in the pin hole from the interior of the locker arm shaft 40, the switching pins 45 and 46 move against the biasing force of the biasing unit 47.

When hydraulic pressure does not act upon the switching pin 45, the switching pins 45 and 46 and the biasing unit 47 are positioned only at the respective pin holes of the valve driving locker arms 41 and the free locker arm 42, and are disconnected from each other, so that the valve driving locker arms 41 and the free locker arm 42 swing independently of each other. Therefore, rotations of the small displacement inlet cams 12s and 12s effectively act upon the valve driving locker arms 41 and 41, and cause the valve driving locker arms 41 and 41 to swing. The intake valves 11 and 11 are driven so as to open and close with a small lift amount, as a result of which the intake valves 11 and 11 are operated by a small suction amount.

In contrast, when hydraulic pressure acts upon the switching pin 45, the switching pin 45 is positioned on respective sides of the valve driving locker arm 41 and the free locker arm 42, and the switching pin 46 is positioned on respective sides of the free locker arm 42 and the valve driving locker arm 41. Therefore, the valve driving locker arms 41 and the free locker arm 42 are connected and integrated to each other and swing. Consequently, rotation of the large-displacement inlet cams 22b effectively acts upon the valve driving locker arms 41 and 41 through the free locker arm 42, and cause the driving locker arms 41 and 41 to swing. The intake valves 11 and 11 are driven so as to open and close with a large lift amount, as a result of which the intake valves 11 and 11 are operated by a large suction amount.

In this way, the constantly driving intake valve driving device 13C of the constantly operating cylinders can switch between an operation by a small suction amount and an operation by a large suction amount by controlling hydraulic pressure.

Since the constantly driving exhaust valve driving device 23C has the same structure, it will not be described below.

Figure 6:
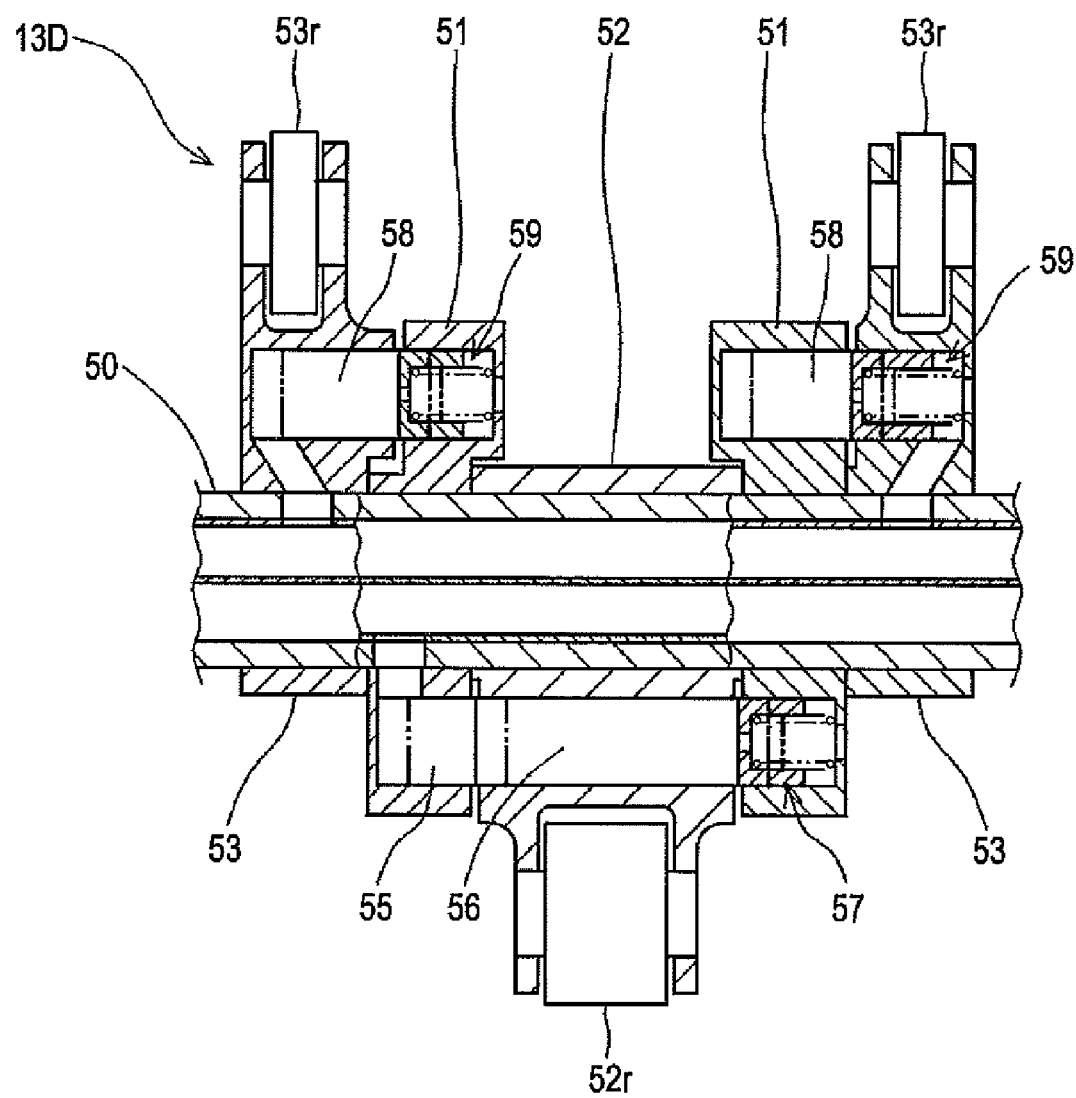
FIG. 6 is a sectional development view of an intake valve driving mechanism having a deactivation mechanism.

Next, the intake valve driving device 13D having the deactivation mechanism will be simply described with reference to a sectional development view of FIG. 6 of the intake valve driving mechanism 13D having the deactivation mechanism.

Valve driving locker arms 51 and 51 that are driven by contacting the pair of intake valves 11 and 11 of the deactivation cylinder are swingably supported by a locker arm shaft 50. A first free locker arm 52 is interposed between both valve driving locker arms 51 and 51 and is swingably supported by the locker arm shaft 50. Further, second free locker arms 53 and 53 are swingably supported by the locker arm shaft 50 so as to be disposed outwardly outside of and adjacent to the respective valve driving locker arms 51 and 51.

The valve driving locker arms 51 and 51 directly contact the deactivation cams 12d and 12d having no cam protrusions of the inlet cam shaft 12. A roller 52r supported at an end of the first free locker arm 52 contacts the large-displacement inlet cam 12b having a high cam protrusion of the inlet cam shaft 12. Rollers 53r and 53r supported at ends of the second free locker arms 53 and 53 contact the small-displacement inlet cams 12s and 12s having low cam protrusions of the inlet cam shaft 12.

The center first free locker arm 52 and the valve driving locker arms 51 and 51 on the respective sides of the first free locker arm 52 are fitted and inserted by biasing switching pins 55 and 56 against pin holes (which become coaxial in a closed valve state) by a biasing unit 57. When hydraulic pressure acts upon the switching pin 55 in the pin hole from the interior of the locker arm shaft 50, the switching pins 55 and 56 move against the biasing force of the biasing unit 57.

When hydraulic pressure does not act upon the switching pin 55, the switching pins 55 and 56 and the biasing unit 57 are positioned only at the respective pin holes of the valve driving locker arms 51 and the free locker arm 52, so that the valve driving locker arms 51 and the first free locker arm 52 swing independently of each other. When hydraulic pressure acts upon the switching pin 55, the switching pin 55 is positioned on respective sides of the valve driving locker arm 51 and the first free locker arm 52, the switching pin 56 is positioned on respective sides of the first free locker arm 52 and the valve driving locker arm 51, and the valve driving locker arms 51 and the first free locker arm 52 are connected and integrated to each other and swing.

The valve driving locker arms 51 and 51 and the second free locker arms 53 and 53, adjacent to the valve driving locker arms 51 and 51 at the outer sides thereof, are fitted to and inserted by biasing switching pins 58 and 58 against pin holes (which are coaxially provided in a closed valve state) by biasing units 59 and 59.

When hydraulic pressure acts upon the switching pins 58 and 58 in the pin holes from the interior of the locker arm shaft 50, the switching pins 58 and 58 move against biasing forces of the biasing units 59 and 59.

When hydraulic pressure does not act upon the switching pins 58 and 58, the switching pins 58 and 58 and the biasing units 59 and 59 are positioned only at the pin holes of the respective valve driving locker arms 51 and 51 and the second free locker arms 53 and 53, and the valve driving locker arms 51 and 51 and the second free locker arms 53 and 53 are disconnected from each other, so that they swing independently of each other. In contrast, when hydraulic pressure acts upon the switching pins 58 and 58, the switching pins 58 and 58 are positioned on respective sides of the valve driving locker arms 51 and 51 and the second free locker arms 53 and 53. Therefore, the valve driving locker arms 51 and 51 and the second free locker arms 53 and 53 are connected to each other, and swing together.

Therefore, when hydraulic pressure does not act upon the switching pin 55 and the switching pins 58 and 58, the first free locker arm 52, the valve driving locker arms 51 and 51, and the second free locker arms 53 and 53 swing independently of each other. Consequently, the valve driving locker arms 41 and 41 that contact the deactivation cams 12d and 12d (which do not have cam protrusions) of the inlet cam shaft 12 that rotates do not swing, so that the intake valves 11 and 11 are deactivated in a closed valve state.

When hydraulic pressure acts upon the switching pins 58 and 58 from this state, the switching pins 58 and 58 connect the valve driving locker arms 51 and 51 and the respective second free locker arms 53 and 53 to each other. Therefore, the rotation of the small-displacement inlet cams 12s and 12s effectively acts upon the valve driving locker arms 51 and 51 through the second free locker arms 53 and 53, causing the valve driving locker arms 51 and 51 to swing. Accordingly, the intake valves 11 and 11 are driven so as to open and close with a small lift amount, so that they are operated by a small suction amount.

When hydraulic pressure acts upon the switching pin 55 from the deactivation operation state, the switching pins 55 and 56 connect the first free locker arm 52 and the valve driving locker arms 51 and 51 to each other. Therefore, the rotation of the large-displacement inlet cam 22b effectively acts upon the valve driving locker arms 51 and 51 through the first free locker arm 52, causing the valve driving locker arms 51 and 51 to swing. Accordingly, the intake valves 11 and 11 are driven so as to open and close with a large lift amount, so that they are operated with a large suction amount.

In this way, by controlling hydraulic pressure, the intake valve driving device 13D provided with the deactivation mechanism for the deactivation cylinders can switch between the closed-valve deactivation operating state, the small-suction-amount operating state, and the large-suction-amount operating state.

Since the exhaust valve driving device 23D having the deactivation mechanism has the same structure, it will not be described.

When a cylinder deactivation command signal exists during the operation of the internal combustion engine E, at the four deactivation cylinders (that is, the two outer cylinders in the left cylinder row 2L and the two inner cylinders in the right cylinder row 2R), the first free locker arm 52, the valve driving locker arms 51 and 51, and the second free locker arms 53 and 53 are disconnected from each other and swing independently of each other. The intake valves 11 and the exhaust valves 21 are deactivated in the closed valve state. The other four constantly operating cylinders are in the operating state (or the deactivation operating state).

When the number of rotations or the load on the internal combustion engine E is low, at the constantly operating cylinders, the free locker arm 42 and the valve driving locker arms 41 and 41 are disconnected from each other; and, at the deactivation cylinders, the valve driving locker arms 51 and 51 and the respective second free locker arms 53 and 53 are connected to each other, and the first free locker arm 52 and the valve driving locker arms 51 and 51 are disconnected from each other, so that the internal combustion engine E is in the small-suction-amount operating state.

When the number of rotations or the load on the internal combustion engine E is high, at the constantly operating cylinders, the free locker arm 42 and the valve driving locker arms 41 and 41 are connected to each other; and, at the deactivation cylinders, the valve driving locker arms 51 and 51 and the respective second free locker arms 53 and 53 are disconnected from each other, and the first free locker arm 52 and the valve driving locker arms 51 and 51 are connected to each other, so that the internal combustion engine E is in the large-suction-amount operating state.

Accordingly, in the right cylinder row 2R provided with the DOHC valve operating mechanism, as mentioned above, the fuel injection pump 70 (driven by the pump cam 12p formed in the excessively provided space of the inlet cam shaft 12) is a pump in which a plunger formed integrally with the pump lifter 701 reciprocates in a pump cylinder. Although not illustrated, pressurized fuel is sent to a suction port 71 from the fuel tank by a feed pump. Then, the fuel is sucked into a fuel pressure chamber in the pump cylinder. Thereafter, the compressed fuel from a discharge port 72 is discharged to a fuel distribution pipe.

A spill valve (not shown) is built in the fuel injection pump 70. By controlling an opening/closing period of the spill valve, it is possible to adjust the amount of pressurized fuel sent from the discharge port 72, and to adjust hydraulic pressure in the fuel distribution pipe (that is, to perform fuel spill control).

From the fuel distribution pipe, high-pressure fuel subjected to the fuel spill control is supplied to the fuel injection valves 30 that directly inject fuel into the combustion chambers 8 of the four cylinders in the right cylinder row 2R. Therefore, fuel injection pressure of the fuel injection valves 30 is controlled by the fuel spill control.

The left cylinder row 2L and the right cylinder row 2R are symmetrically provided. The left cylinder row 2L has the same structure as the right cylinder row 2R.

As mentioned above, in the V type eight-cylinder internal combustion engine E, deactivation cams are not required for the inlet cam shaft 12 in the constantly operating cylinders. In addition, the pump cam 12p is provided in the space in which the deactivation cams can be provided. Further, the fuel injection pump 70 is disposed by contacting the pump lifter 701 with the pump cam 12p. Accordingly, it is not necessary to provide the pump cam 12p by extending the inlet cam shaft 12. Therefore, it is possible to dispose the fuel pump 70 without making the inlet cam shaft 12 elongated, so that the entire width of the internal combustion engine E in the direction of the operating valve cam shaft can be reduced.

In the V type eight-cylinder internal combustion engine E, the valve phase varying mechanism 38 is provided at the exhaust cam shaft 22, and the fuel injection pump 70 is disposed at the inlet cam shaft 12 that is not provided with the valve phase varying mechanism 38. Therefore, the fuel injection pump 70 can be stably driven by a fuel spill control operation regardless of a change in a cam phase by the valve phase varying mechanism 38.

If the valve phase varying mechanism 38 is not provided at the exhaust cam shaft 22, the fuel injection pump 70 and the pump cam 12p are provided at either one of the inlet cam shaft 12 and the exhaust cam shaft 22, thereby realizing a high design freedom.

Although, in the aforementioned embodiment, the present invention is applied to a V type eight-cylinder internal combustion engine, the present invention may also be applied to an in-line multi-cylinder internal combustion engine.

Although the pump cam is formed at a valve operating cam shaft, and the fuel injection pump 70 is driven, it is possible to apply the present invention to the case in which an auxiliary device such as a water pump is driven or an auxiliary device is driven by engaging gears that are formed at the valve operating cam shaft.

According to an embodiment of the present invention, there is provided an auxiliary-device arrangement of a cylinder-deactivation multi-cylinder internal combustion engine which is capable of deactivating a cylinder or some cylinders among a plurality of cylinders by keeping an intake valve and an exhaust valve closed, and which constantly operates the remaining cylinder or the remaining cylinders. An auxiliary-device driving member is provided adjacent to an operating cam of a valve operating cam shaft at a cylinder that is constantly operated among the plurality of cylinders, and an auxiliary device is disposed by contacting an operating section with the auxiliary-device driving member.

According to the auxiliary-device arrangement of the cylinder-deactivation multi-cylinder internal combustion engine of the embodiment of the present invention, a deactivation cam is not required in addition to the operating cam of the valve operating cam shaft at the cylinder that is constantly operated. In addition, an auxiliary-device driving member is provided in a space in which a deactivation cam can be provided. Further, an auxiliary device is disposed by contacting the operating section with the auxiliary device driving member. Thus, the auxiliary-device driving member may not be provided by extending the valve operating cam shaft. Therefore, the auxiliary device can be disposed without making the valve operating cam shaft long, and the entire width of the internal combustion engine in the direction of the valve operating cam shaft can be reduced.

In the auxiliary-device arrangement of the cylinder-deactivation multi-cylinder internal combustion engine, a plurality of the valve operating cam shafts may be provided and may include an inlet cam shaft and an exhaust cam shaft; and the auxiliary device may be disposed at least one of the inlet cam shaft and the exhaust cam shaft at the cylinder that is constantly operated.

According to this auxiliary-device arrangement of the cylinder-deactivation multi-cylinder internal combustion engine, an inlet cam shaft and an exhaust cam shaft are provided as the valve operating cam shafts, and the auxiliary device is disposed at least one of the inlet cam shaft and the exhaust cam shaft at the cylinder that is constantly operated. Therefore, the auxiliary device may be provided at either one of the inlet cam shaft and the exhaust cam shaft, thereby making it possible to realize a high design freedom.

In the auxiliary-device arrangement of the cylinder-deactivation multi-cylinder internal combustion engine, a valve phase varying mechanism may further be provided at one of the inlet cam shaft and the exhaust cam shaft, and the auxiliary device may be disposed at the other cam shaft at which the valve phase varying mechanism is not provided.

According to this auxiliary-device arrangement of the cylinder-deactivation multi-cylinder internal combustion engine, the valve phase varying mechanism is provided at one of the inlet cam shaft and the exhaust cam shaft, and the auxiliary device is disposed at the other cam shaft at which the valve phase varying mechanism is not provided. Therefore, the auxiliary device can be stably driven by a simple controlling operation regardless of a change in a cam phase caused by the valve phase varying mechanism.

In the auxiliary-device arrangement of the cylinder-deactivation multi-cylinder internal combustion engine, a fuel injection valve that directly injects fuel into a fuel chamber of the internal combustion engine may be further provided; and the auxiliary device may be a fuel injection pump that sends pressurized fuel towards the fuel injection valve by driving the fuel injection pump as a result of contacting the operating section with a pump cam serving as the auxiliary-device driving member of the valve operating cam shaft.

According to this auxiliary-device arrangement of the cylinder-deactivation multi-cylinder internal combustion engine, a fuel injection valve that directly injects fuel into a fuel chamber of the internal combustion engine is further provided, and the auxiliary device is a fuel injection pump that sends pressurized fuel towards the fuel injection valve by driving the fuel injection pump as a result of contacting the operating section with a pump cam serving as the auxiliary-device driving member of the valve operating cam shaft. Therefore, it is possible to supply fuel at a high pressure to the fuel injection valve when the rotation of the valve operating shaft causes the fuel injection pump to be driven.

By disposing the fuel injection pump at the other cam shaft at which the valve phase varying mechanism is not provided, a fuel spill control operation of the fuel injection pump can be simplified regardless of a change in the valve phase.

Obviously, numerous modifications and variations of the present invention are possible in light of the above teachings. It is therefore to be understood that within the scope of the

What is claimed as new and is desired to be secured by Letters Patent of the United States is:

1. An auxiliary-device arrangement for a cylinder-deactivation multi-cylinder internal combustion engine which is capable of deactivating at least one deactivated cylinder by keeping an intake valve and an exhaust valve closed while at least one operating cylinder is operating, the auxiliary-device arrangement comprising:
    an auxiliary-device driving member provided adjacent to a first operating cam of a valve operating cam shaft, the auxiliary-device driving member being rotatable along with the valve operating cam shaft and being provided only in the at least one operating cylinder, the at least one operating cylinder being configured to constantly operate without deactivation during operation of the cylinder-deactivation multi-cylinder internal combustion engine; and
    an auxiliary device having an operating member via which the auxiliary device contacts the auxiliary-device driving member.

2. The auxiliary-device arrangement for the cylinder-deactivation multi-cylinder internal combustion engine according to claim 1,
    wherein the valve operating cam shaft comprises an inlet cam shaft and an exhaust cam shaft, and
    wherein the auxiliary device is disposed at least one of the inlet cam shaft and the exhaust cam shaft which is provided in the at least one operating cylinder.

3. The auxiliary-device arrangement for the cylinder-deactivation multi-cylinder internal combustion engine according to claim 2, further comprising:
    a valve phase varying mechanism provided at one of the inlet cam shaft and the exhaust cam shaft, and
    wherein the auxiliary device is disposed at the inlet cam shaft or the exhaust cam shaft at which the valve phase varying mechanism is not provided.

4. The auxiliary-device arrangement for the cylinder-deactivation multi-cylinder internal combustion engine according to claim 1, further comprising:
    a fuel injection valve configured to directly inject fuel into a fuel chamber of the internal combustion engine, and
    wherein the auxiliary device is a fuel injection pump configured to send pressurized fuel towards the fuel injection valve, and the auxiliary-device driving member is a pump cam provided at the valve operating cam shaft and contacting the operating member of the fuel injection pump to drive the fuel injection pump.

5. The auxiliary-device arrangement for the cylinder-deactivation multi-cylinder internal combustion engine according to claim 1, wherein
    the valve operating cam shaft includes the first operating cam, a second operating cam, and a deactivation cam, the first operating cam being provided to drive a first valve provided in the operating cylinder, the second operating cam being provided to drive a second valve provided in the deactivated cylinder, the deactivation cam being provided to deactivate the second valve, and
    the auxiliary-device driving member is provided closer to the first operating cam than the deactivation cam.

6. The auxiliary-device arrangement for the cylinder-deactivation multi-cylinder internal combustion engine according to claim 5, wherein
    a first valve driving mechanism is provided to convert rotational motion of the first operating cam into opening and closing motion of the first valve, and is provided between the first operating cam and the first valve,
    a second valve driving mechanism is provided to convert rotational motion of the second operating cam into opening and closing motion of the second valve, and is provided between the second operating cam and the second valve, and
    the auxiliary-device driving member is provided closer to the first valve driving mechanism than the second valve driving mechanism.

7. The auxiliary-device arrangement for the cylinder-deactivation multi-cylinder internal combustion engine according to claim 6, wherein
    the first valve driving mechanism is provided to change an amount of motion of the first valve in accordance with a state of operation of the cylinder-deactivation multi-cylinder internal combustion engine, and
    the second valve driving mechanism is provided to change an amount of motion of the second valve in accordance with a state of operation of the cylinder-deactivation multi-cylinder internal combustion engine.

8. The auxiliary-device arrangement for the cylinder-deactivation multi-cylinder internal combustion engine according to claim 5, wherein
    the auxiliary-device driving member is provided between the first operating cam and the second operating cam.

9. The auxiliary-device arrangement for the cylinder-deactivation multi-cylinder internal combustion engine according to claim 5, wherein
    the valve operating cam shaft is rotatable supported by a first holder, a second holder, and a third holder, the second holder being provided between the first and third holders,
    the first operating cam and the deactivation cam are provided between the first holder and the second holder, and
    the second operating cam is provided between the second holder and the third holder.

10. An auxiliary-device arrangement for a cylinder-deactivation multi-cylinder internal combustion engine which is capable of deactivating at least one deactivated cylinder by keeping an intake valve and an exhaust valve closed while at least one operating cylinder is operating, the auxiliary-device arrangement comprising:
    driving means for driving auxiliary means and provided adjacent to a first operating cam of a valve operating cam shaft, the driving means being rotatable along with the valve operating cam shaft and being provided only in the at least one operating cylinder, the at least one operating cylinder being configured to constantly operate without deactivation during operation of the cylinder-deactivation multi-cylinder internal combustion engine; and
    the auxiliary means having an operating member via which the auxiliary means contacts the driving means.

11. The auxiliary-device arrangement for the cylinder-deactivation multi-cylinder internal combustion engine according to claim 10, wherein
    the valve operating cam shaft includes the first operating cam, a second operating cam, and a deactivation cam, the first operating cam being provided to drive a first valve provided in the operating cylinder, the second operating cam being provided to drive a second valve provided in the deactivated cylinder, the deactivation cam being provided to deactivate the second valve, and
    the driving means is provided closer to the first operating cam than the deactivation cam.

12. The auxiliary-device arrangement for the cylinder-deactivation multi-cylinder internal combustion engine according to claim 11, wherein
- a first valve driving mechanism is provided to convert rotational motion of the first operating cam into opening and closing motion of the first valve, and is provided between the first operating cam and the first valve,
- a second valve driving mechanism is provided to convert rotational motion of the second operating cam into opening and closing motion of the second valve, and is provided between the second operating cam and the second valve, and
- the driving means is provided closer to the first valve driving mechanism than the second valve driving mechanism.

13. The auxiliary-device arrangement for the cylinder-deactivation multi-cylinder internal combustion engine according to claim 12, wherein
- the first valve driving mechanism is provided to change an amount of motion of the first valve in accordance with a state of operation of the cylinder-deactivation multi-cylinder internal combustion engine, and
- the second valve driving mechanism is provided to change an amount of motion of the second valve in accordance with a state of operation of the cylinder-deactivation multi-cylinder internal combustion engine.

14. The auxiliary-device arrangement for the cylinder-deactivation multi-cylinder internal combustion engine according to claim 11, wherein
- the driving means is provided between the first operating cam and the second operating cam.

15. The auxiliary-device arrangement for the cylinder-deactivation multi-cylinder internal combustion engine according to claim 11, wherein
- the valve operating cam shaft is rotatable supported by a first holder, a second holder, and a third holder, the second holder being provided between the first and third holders,
- the first operating cam and the deactivation cam are provided between the first holder and the second holder, and
- the second operating cam is provided between the second holder and the third holder.

16. A cylinder-deactivation multi-cylinder internal combustion engine comprising:
- at least one operating cylinder configured to constantly operate without deactivation during operation of the cylinder-deactivation multi-cylinder internal combustion engine;
- at least one deactivated cylinder configured to be deactivated by keeping an intake valve and an exhaust valve closed while the at least one operating cylinder is operating;
- an auxiliary-device driving member provided adjacent to a first operating cam of a valve operating cam shaft, the auxiliary-device driving member being rotatable along with the valve operating cam shaft and being provided only in the at least one operating cylinder; and
- an auxiliary device having an operating member via which the auxiliary device contacts the auxiliary-device driving member.

17. The cylinder-deactivation multi-cylinder internal combustion engine according to claim 16, further comprising:
- a valve operating cam shaft including a first operating cam, a second operating cam, and a deactivation cam, the first operating cam being provided to drive a first valve provided in the operating cylinder, the second operating cam being provided to drive a second valve provided in the deactivated cylinder, the deactivation cam being provided to deactivate the second valve,
- wherein the auxiliary-device driving member is provided closer to the first operating cam than the deactivation cam.

18. The cylinder-deactivation multi-cylinder internal combustion engine according to claim 17, further comprising:
- a first valve driving mechanism provided to convert rotational motion of the first operating cam into opening and closing motion of the first valve, the first valve driving mechanism being provided between the first operating cam and the first valve; and
- a second valve driving mechanism provided to convert rotational motion of the second operating cam into opening and closing motion of the second valve, the second valve driving mechanism being provided between the second operating cam and the second valve, wherein
- the driving means is provided closer to the first valve driving mechanism than the second valve driving mechanism.

19. The cylinder-deactivation multi-cylinder internal combustion engine according to claim 18, wherein
- the first valve driving mechanism is provided to change an amount of motion of the first valve in accordance with a state of operation of the cylinder-deactivation multi-cylinder internal combustion engine, and
- the second valve driving mechanism is provided to change an amount of motion of the second valve in accordance with a state of operation of the cylinder-deactivation multi-cylinder internal combustion engine.

20. The cylinder-deactivation multi-cylinder internal combustion engine according to claim 17, wherein
- the auxiliary-device driving member is provided between the first operating cam and the second operating cam.

* * * * *